(12) United States Patent
Zbeda et al.

(10) Patent No.: US 11,361,606 B1
(45) Date of Patent: Jun. 14, 2022

(54) TAMPER RESISTANT PUBLIC LEDGER VOTING SYSTEM

(71) Applicants: Oren Zbeda, Bnei Brak (IL); Eran Eliyahu Tobul, Bal Harbour, FL (US)

(72) Inventors: Oren Zbeda, Bnei Brak (IL); Eran Eliyahu Tobul, Bal Harbour, FL (US)

(*) Notice: Subject to any disclaimer, the term of this patent is extended or adjusted under 35 U.S.C. 154(b) by 4 days.

(21) Appl. No.: 17/106,130

(22) Filed: Nov. 29, 2020

(51) Int. Cl.
*G07C 13/00* (2006.01)
*H04L 9/08* (2006.01)

(52) U.S. Cl.
CPC ............. *G07C 13/00* (2013.01); *H04L 9/085* (2013.01); *H04L 9/0825* (2013.01)

(58) Field of Classification Search
CPC ........ G07C 13/00; H04L 9/0825; H04L 9/085
USPC ....................................................... 235/386
See application file for complete search history.

(56) References Cited

U.S. PATENT DOCUMENTS

| | | |
|---|---|---|
| 5,495,532 A | 2/1996 | Kilian et al. |
| 2002/0077885 A1 | 6/2002 | Karro et al. |
| 2002/0128978 A1 | 9/2002 | Neff |
| 2002/0133396 A1* | 9/2002 | Barnhart ............... G07C 13/00 705/12 |
| 2003/0158775 A1 | 8/2003 | Chaum |
| 2012/0095811 A1 | 4/2012 | Tagawa |
| 2017/0352219 A1* | 12/2017 | Spanos ................. H04L 9/3239 |
| 2019/0005756 A1 | 1/2019 | Chaum |
| 2019/0371106 A1* | 12/2019 | Kaye ..................... G07C 13/00 |
| 2020/0219351 A1* | 7/2020 | Cho ....................... G07C 13/00 |

FOREIGN PATENT DOCUMENTS

CN 109523683 A 3/2019

* cited by examiner

*Primary Examiner* — Daniela A Hess (57) ABSTRACT

There is disclosed an electronic voting system for tamper resistant voting. In some embodiments of a system and/or method for allows a voter to verify that his vote was recorded properly and/or allows public counting of votes by any entity. For example, the system may record information on a distributed ledger that prevents changing of votes. For example, enough data may be available to each voter to check that his vote was recorded properly and/or to substantiate and/or prove if it was not recorded properly. For example, public data may be recorded anonymously such that a third party may be able to access the number of votes, but not the identify of individual voters. Optionally, the individual voter may be supplied a way to substantiate a claim that he voted for either party of the election.

33 Claims, 5 Drawing Sheets

TAMPER RESISTANT PUBLIC LEDGER VOTING SYSTEM

FIELD AND BACKGROUND OF THE INVENTION

The present invention, in some embodiments thereof, relates to an electronic voting system and, more particularly, but not exclusively, to a system and method for tamper resistant voting.

U.S. Pat. No. 7,099,471 appears to disclose, "A facility for discerning corruption of an electronic ballot.... The facility sends from a first computer system to a second computer system an encrypted ballot that reflects a ballot choice selected by a voter. The facility then sends a confirmation from the second computer system to the first computer system, which serves to convey the decrypted contents of the encrypted ballot as received at the second computer system, and which is generated without decrypting the encrypted ballot. In the first computer system, the facility uses the confirmation to determine whether the decrypted contents of the encrypted ballot as received at the second computer system match the ballot choice selected by the voter."

US Patent Application Publication no. 20020077885 appears to disclose, "A method of holding an election including enabling voters to register with a registrar facility by providing encryption keys to registered voters and storing the encryption key with an authenticator facility. The method includes distributing ballots having unique ballot ID's to requesting voters, receiving ballots having voter choices on them and encrypted using voters encryption keys, receiving from voters ballot ID, encrypted vote information and, voter ID at an authenticator facility, indications that votes have been cast with a ballots having indicated ballot ID's at a distributor facility, and an indication that the voter has voted at a registrar facility. The method includes authenticating the voter at the authenticator facility and passing authenticated votes and the ballot ID to a counter facility."

US Patent Application Publication no. 20020133396 appears to disclose, "A method and system for securely voting over a network, such as a global computer network, involves a system which delivers an electronic ballot from a server with the server's private key and a vote serial number on the ballot to an individual terminal connected to the network. The ballot may be filled in and a subset of the filled-in ballot is created with a digital signature created from the individual's secret key on the subset of the ballot corresponding to the ballot choices. The subset of the filled-in ballot together with the individual's electronic signature, and a vote serial number is then delivered to the server. A data element is then created to record a subset of the ballot in a data store at the server, in which the ballot vote information is retained as a vote."

U.S. Pat. No. 5,495,532 appears to disclose, "A number-theoretic based algorithm . . . for secure electronic voting. A voter may cast a vote among n centers in a manner which prevents fraud and authenticates the votes. Preprocessing allows for nearly all of the communication and computation to be performed before any voting takes place. Each center can verify that each vote has been properly counted. The algorithm is based on families of homomorphic encryptions which have a partial compatibility property. The invention can be realized by current-generation PCs with access to an electronic bulletin board."

US Patent Application Publication no. 20190005756 appears to disclose that, "A method allows a random sample of a large population of voters to cast votes and for both the unpredictability/un-manipulability of the sample selection and the integrity of the tally to be verified by any interested parties using public information. The problem of vote selling is addressed. Also, a variant allows voters to remain substantially anonymous."

U.S. Pat. No. 7,210,617 appears to disclose that, "An election system provides, in one example, each voter with multiple physical 'layers' that the voter is able to choose between. The voter takes part of the layers as a kind of receipt and the other layers are retained and/or destroyed by the system. The actual vote is not readily revealed by the layers taken by the voter, thus protecting against improper influence. In the voting booth, when all the layers are combined, however, the voter is readily able to verify the vote. Moreover, posted images of the layers not taken by the voter can be used to compute the election results in a way that is verifiable by interested parties. The results cannot be changed without substantial probability of detection and privacy of votes can be maintained unless a number of parties are compromised or collude."

Chinese Patent Application Publication no. CN109523683 appears to disclose, "a kind of blank electronic voting methods based on block chain technology; this process employs homomorphic encryption algorithms to hide ballot content; guarantee the validity of ballot paper using zero-knowledge proof technology simultaneously; collection, count of votes process and the result of ballot paper, which disclose, to be carried out on block catenary system; wherein; trusted computation environment is utilized in the decryption of voting results, solves the problems, such as that voting results decrypting process private key is touched net under traditional approach, truly protects the blank attribute of ballot."

US Patent Application Publication no. 20190005756 appears to disclose, "an electronic voting system in which a polling administration unit, upon receiving encoded vote content data encoded by a temporary key from a voting unit, generates a reference value capable of identifying sameness of the encoded vote content data and sends it to a voter list administration unit, the voter list administration unit receives the temporary key, the reference value of the encoded vote content data, and voter identification data for identifying a voter from the voting unit, determines that a vote is valid when the reference value received from the voting unit and the reference value received from the polling administration unit match as well as a voter identified by the voter identification data is qualified by voter list data."

SUMMARY OF THE INVENTION

According to an aspect of some embodiments of the invention, there is provided a method for on-line voting including: distributing a plurality of respective private keys and associated public keys anonymously to each respective voter of a plurality of voters; publishing a list of the plurality of public keys on a secure public ledger; receiving an encrypted vote, encrypted with the respective private key of the respective voter; recording the encrypted vote on a the secure public ledger; and reading the encrypted vote from the secure public ledger for counting an election result.

According to some embodiments of the invention, the method further includes: publishing a time of receiving of the respective private keys in the secure public ledger.

According to some embodiments of the invention, the time is approximate.

According to some embodiments of the invention, the public ledger includes a block chain.

According to some embodiments of the invention, the method further includes: validating the encrypted vote by an election committee and further encrypting the encrypted vote after the validating with a private key of the election committee resulting in a double encrypted validated vote and wherein the recording is of the double encrypted validated vote.

According to some embodiments of the invention, the method further includes: publishing a list of registered voters on the secure public ledger.

According to some embodiments of the invention, the method further includes: publishing a list of voters having received a private key of the plurality of respective private keys on the secure public ledger.

According to some embodiments of the invention, the method further includes: publishing a time of receiving of the private key.

According to some embodiments of the invention, the time is approximate.

According to some embodiments of the invention, the distributing includes giving to the respective voter a physical machine readable medium including the respective private key.

According to some embodiments of the invention, the physical machine readable medium includes a dongle.

According to some embodiments of the invention, the method further includes: generating the plurality of respective private keys in a number exactly equal to a number of registered voters.

According to some embodiments of the invention, the distributing includes distributing a respective vote changing key of a plurality of respective vote changing private keys, the method further including adding a changed vote encrypted with the respective vote changing key after the recording and wherein the counting the election result includes counting the changed vote and not counting the respective encrypted vote.

According to some embodiments of the invention, the method further includes: separating the plurality of respective private keys into batches and wherein the distributing is separate for each of the batches.

According to some embodiments of the invention, an identity of a batch of each associated public keys is published in the secure public ledger.

According to some embodiments of the invention, the method further includes: supplying a mechanism to the respective voter to check that his vote is recorded properly on the secure public ledger.

According to some embodiments of the invention, the method further includes: supplying the respective voter with a substantiation of his vote.

According to some embodiments of the invention, the method further includes: supplying the respective voter with a substantiation of a vote that is not his vote.

According to an aspect of some embodiments of the invention, there is provided a method for voting including: voting anonymously by a voter; checking by a voter of how a vote of the voter was recorded; and supplying to the voter with a substantiation of is true vote.

According to some embodiments of the invention, the vote is recorded on a secure public ledger.

According to some embodiments of the invention, the method further includes: supplying the voter with a substantiation of a vote that is not his true vote.

According to some embodiments of the invention, the method further includes: supplying the voter with an identification substantiating an identity of his vote.

According to some embodiments of the invention, the identification includes a half key and wherein the substantiating entails completing the half key with a second half key.

According to some embodiments of the invention, the second half key includes a private key in possession of an election authority.

According to an aspect of some embodiments of the invention, there is provided a system for on-line voting including: a plurality of respective private keys and associated public keys supplied anonymously to each respective voter of a plurality of voters; a secure public ledger including a list of the plurality of public keys; and a vote of the respective voter with the respective private key of the respective voter.

According to some embodiments of the invention, the secure public ledger further includes a time of receiving of the respective private keys.

According to some embodiments of the invention, the time is approximate.

According to some embodiments of the invention, the public ledger includes a block chain.

According to some embodiments of the invention, the system further includes: a validation private key and wherein the vote is validated by an election committee and encrypted with the validation private key resulting in a double encrypted validated vote and wherein the vote of the respective voter in the secure public ledger includes the double encrypted validated vote.

According to some embodiments of the invention, the secure public ledger further includes a list of registered voters.

According to some embodiments of the invention, the secure public ledger further includes a list of voters having received a private key of the plurality of respective private keys.

According to some embodiments of the invention, the secure public ledger further includes a time of receipt of each private key of the plurality of respective private keys.

According to some embodiments of the invention, the time of receipt is approximate.

According to some embodiments of the invention, the system further includes: a physical machine readable medium including a respective private key of the plurality of respective private keys for distribution to the respective voter.

According to some embodiments of the invention, the physical machine readable medium includes a dongle.

According to some embodiments of the invention, a number of the plurality of respective private keys is exactly equal to a number of the plurality of registered voters.

According to some embodiments of the invention, the system further includes: a respective vote changing private key for each respective private key and wherein the system is further configured for adding a changed vote encrypted with the respective vote changing to the secure public ledger.

According to some embodiments of the invention, the plurality of respective private keys are separated into batches.

According to some embodiments of the invention, the secure public ledger further includes an identity of a batch associated the each of the associated public keys.

According to some embodiments of the invention, the system further includes: a mechanism for the respective voter to check that his vote is recorded properly on the secure public ledger.

According to some embodiments of the invention, the system further includes: a substantiation of a vote of configured for sending to the respective voter.

According to some embodiments of the invention, the system further includes: a substantiation of a vote configured identifying the voter.

According to some embodiments of the invention, the substantiation includes a half key configured to identify the voter when completed by another half key.

According to some embodiments of the invention, the another half key is a private key in possession of an election authority.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) and/or a mesh network (meshnet, emesh) and/or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g. the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Overview

The present invention, in some embodiments thereof, relates to an electronic voting system and, more particularly, but not exclusively, to a system and method for tamper resistant voting.

An aspect of some embodiments of the current invention relates to a system and/or method for voting that allows a voter to verify that his vote was recorded properly and/or allows public counting of votes by any entity and/or protects the integrity of the results even from the authors of the software and/or even from hackers that have compromised the security of the system. For example, the system may record information on a distributed ledger that prevents a hacker from changing the votes. For example, enough data may be available to each voter to allow him to check that his vote was recorded properly and/or to substantiate and/or prove if it was not recorded properly and/or to prove that his vote was not recorded to his satisfaction. For example, public data may be recorded anonymously such that a third party may be able to access the number of votes, but not the identify of individual voters.

In some embodiments, the individual voter may be supplied a way to substantiate a claim that he voted for either party of the election. For example, this may inhibit voter extorsion and/or buying votes. For example, a private identification half key may be supplied which when completed with another second private half key identifies the public key of the voter. For example, the other private half may be in possession of the election committee. Optionally, a voter may use this key to positively identify that he is the real voter. For example, the voter may use this key to report an irregularity and/or nullify a previous vote and/or change a vote. Optionally use of this key may entail some voter action (e.g. to inhibit fraudulent use of the key). For example, in order to use the identification half key (e.g. get access to second private half key) a voter may be required to identify himself (e.g. to the election committee) and/or to show up at the election committee in person and/or to sign a declaration that he is not committing fraud and/or coercing another voter. In some embodiments, the use of this half will facilitate reporting of irregularities and/or nullifying false vote while allowing the election committee to investigate the circumstances and prevent misuse of the identification key. For example, this may inhibit use of stolen keys and/or coercing a vote to give over his key when coercing a voter's vote. In some embodiments, only a full private key (e.g. the private key used for voting and/or the combination of the private identification half key with the elections committees half) can be associated to a public key, so the half key does not give away the voter's vote In some embodiments, a method of voting will inhibit cheating in elections, whether the cheating is perpetrated by a person and/or a group of persons, some embodiments of the current invention may inhibit the cheating by developers who wrote the software and/or hackers. For example, even if a hacker succeeds in breaking into an election computer system, some embodiments of the current will prevent him from changing the election results. In some embodiments of the current invention, voter anonymity will be maintained. In some embodiments, in accordance with the current invention facilitates secure voting without voters going to a polling station.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Figure 1:
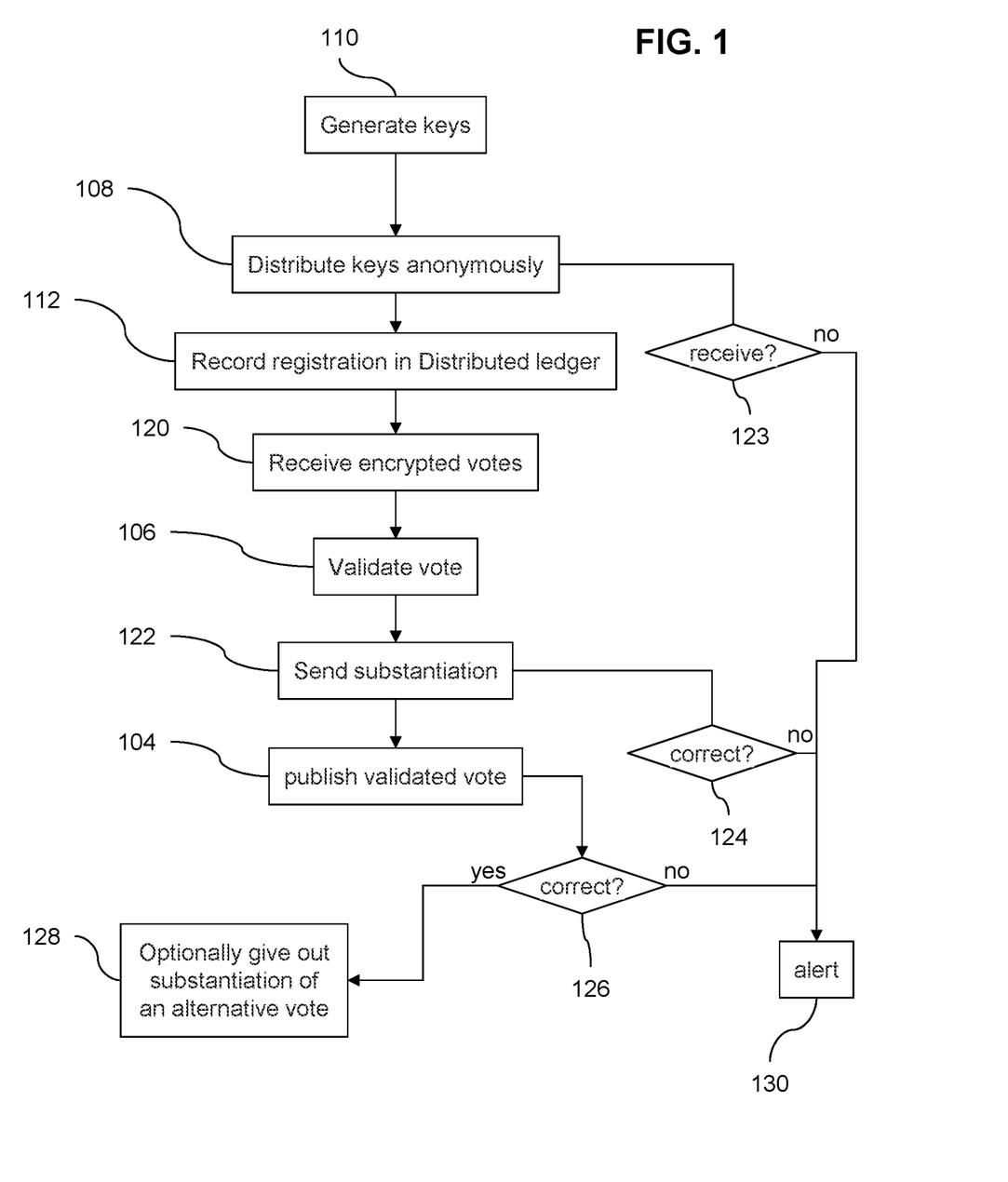
FIG. 1 is a flow chart illustration of a method of voting in accordance with an embodiment of the current invention.

Referring now to the drawings, FIG. 1 illustrates a method of voting in accordance with an embodiment of the current invention.

In some embodiments, a list is generated 110 of eligible voters. In some embodiments, a set of public/private key sets are created 110. For example, the set may include a number of key pairs that is exactly equal to the number of registered voters. Optionally, each set includes a public key and/or a matching private key. For example, a voter encrypts his ballot with the private key and/or the ballot can be decrypted with the public key. Alternatively or additionally, there may be further keys in a key set, for example a key may exist that is used for changing a vote and or identifying a user reporting voting fraud.

In some embodiments, a private key and/or a key set is distributed 108 to each registered voter. Optionally, the distribution 108 is anonymous. The distribution 108 of key sets may be unconditional and/or conditioned. For example, distribution 108 may be conditioned on an act by the registered voter (e.g. acknowledging an email, acknowledging an SMS, requesting a ballot, showing up at a distribution station).

In some embodiments, list of eligible voters is recorded 112 in a secure public form, for example, on a distributed ledger. Additionally or alternatively, all or some of the public keys are recorded 112 in the ledger. Additionally or alternatively, all or some of the recipients of keys are recorded 112 in the ledger. For example, the ledger may be resistant be being changed (e.g. could be blockchain). Optionally, the public record does not include which key belongs to which voter. Optionally, any legal vote must be signed with a private key that corresponds to one of the public keys in the ledger. Optionally, the ledger is always public for all people and parties.

In some embodiments, the time that a voter received his key and/or the time that each public key (with its corresponding private key) was distributed may be recorded on the ledger. Optionally, the time is recorded 112 in a way that facilitates detecting of fraud while inhibiting identifying a voter with a received public key. For example, the times may be recorded only at precision ranging between 1 minute to one hour and/or between 1 hour to 1 day. Alternatively or additionally, keys may be distributed in blocks of size ranging between 10 to 300 and/or between 300 and 3000 and/or between 3000 to 10000 and/or between 10000 to 100000. For example, the length of the time interval and/or size of the block may be at a measured precision to allow tracking of fraud such as some intercepting the key and voting before the registered voter received the key, but course enough to inhibit matching a time of receipt of an individual voter with a time of receipt of a key.

In some embodiments, distributing 108 the private keys may include recording 112 a key onto a computer readable media and/or distributing 108 the media to a voter. Optionally, each media includes an ID. For example, the private key may be burnt onto a dongle and given to a registered voter. Additionally or alternatively, the voter may be given his public key. A voter may check 123 if he is listed on the ledger as a registered voter and/or if he is listed on the ledger as having received a key and/or if his public key is listed as having been received at the correct time. If he is listed, but did not receive a private key and/or he and/or his key is incorrectly listed and/or listed as having been distributed 108 at the wrong time, the voter may alert 130 the authorities that there is an apparent fraud event.

In some embodiments, a medium (e.g. a dongle including a voter's key set burnt thereon) may include a change key. For example, allowing a voter who wants to change his vote (e.g. because he claims that an unauthorized person voted with his key). Optionally, the change key will be incomplete. For example, the change and/or an identification key alone may not be enough to determine what was is the matching public key and/or what is the associated vote. In some embodiments, the election commission may be required to further encrypt a ballot encrypted with the change key. Optionally, the Election require the voter came in person with identification to report an irregularity in the voting and/or change his vote. For example, this and/or other restrictions on the change key may inhibit cheating and/or mis-use of a change key by a vote coercer to positively identify how a particular voter voted. The change key, is optionally a half key completed by a second public key and/or private key. For example, the second key may be on the voter record and/or on the distributed ledger. Alternatively or additionally, the second half key may be a private key in the possession of the voting committee and/or another authority.

In some embodiments, the record includes which voters are registered and/or which voters have received a key and/or when and/or which public keys have been distributed. Optionally, there is no record and/or it is not known which specific voter received which specific key. Optionally, each private key is revealed only to the voter to whom it pertains.

In some embodiments, voting includes a voter encrypting information with his private key. For example, the voter may place his choice on a ballot and encrypt the ballot with his private key. The encrypted ballot is then sent to an Election Commission, with his public key and/or an identification of the public key (for example a pointer to the public key on the distributed ledger). The election commission optionally receives 120 the encrypted vote and/or or validates 106 the vote. For example, the election committee may check that the vote fits a valid public key that was distributed to a voter and/or has not yet been used. Optionally, the election commission further encrypts the encrypted ballot with a private key of the election commission. When the vote is invalid, the election committee optionally sends a notification to the voter. When the vote is valid, a substantiation of the voter's vote, for example the double encrypted validated vote, is optionally sent back 122 to the voter as a record of his vote. For example, the validated vote may be sent 122 directly to the voter and/or recorded 104 on the distributed ledger. The voter may check 124, 126 the validated vote (e.g. a received version and/or the recorded version e.g. decrypting the vote with his public key and the public key of the election commission). The user may optionally also check if his is the first use of his private key. If the vote is not recorded properly the voter may alert 130 of fraud. For example, when the vote recorded on the distributed ledger differs from the substantiation, the voter may be used to substantiation when alerting 130 an authority of election fraud to show that the vote was recorded improperly.

Verifying a Vote

In some embodiments, a voter is supplied with tools to verify 430 (e.g. see FIG. 4) his vote and/or supply evidence of vote fraud and/or tampering. Optionally, the confirmed vote, e.g. the ballot encrypted by the voter and the election commission may be used by the voter, as a proof of his voting and/or as evidence when there is electoral fraud (e.g. where the validated vote in possession of the voter disagrees with the vote recorded on the ledger and/or when another vote with the same private key precedes the voter's vote). Optionally, the Election Commission does not know who the voter is. Just that ballot can be decrypted with a valid public key (e.g. a public key that exists on the distributed ledger). For example, this shows that the voter has a valid private key. In some embodiments, the election commission may use different private key for validating 106 a vote sent 122 to a voter for substantiating his vote and for validating 106 a vote recorded 104 to the public ledger.

Figure 4:
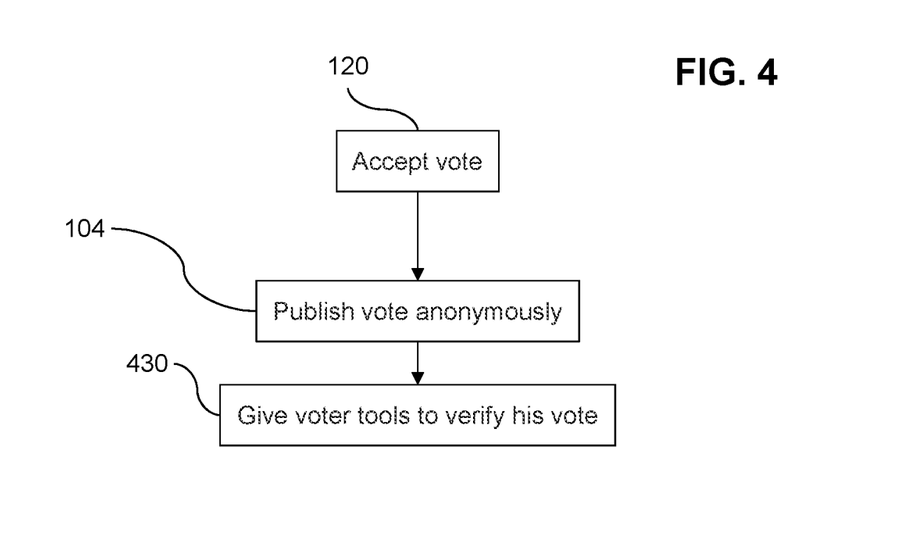
FIG. 4 is a flow chart illustration of a method of verifying a vote in accordance with an embodiment of the current invention.

In some embodiments, the election commission records 104 the confirmed vote (e.g. the ballot with the voter's private key and the election commission's private key) on the distributed ledger. After publication, voting twice is inhibited at least because the entry has already been written on the ledger. Optionally, verification tools may include an identification key which is not published and/or can be used to report irregularities. Use of the identification key may be connected with steps to avoid abuse. For example, the user may be required to identify himself and/or the identification key may only work when used with a used with a private key in possession of the election committee.

In some embodiments, after recording 104 of the vote, the voter can verify 126 that his vote is recorded 104 correctly to the public register. Optionally, any party or organization can create a website that, given a public key, validates the vote. In some embodiments, changing the distributed ledger is inhibited because the ledger is configured to inhibit retroactive changes, only new data can be added, e.g. the vote published on distributed ledger is permanent.

Inhibiting Vote Buying/Extortion

Figure 7:
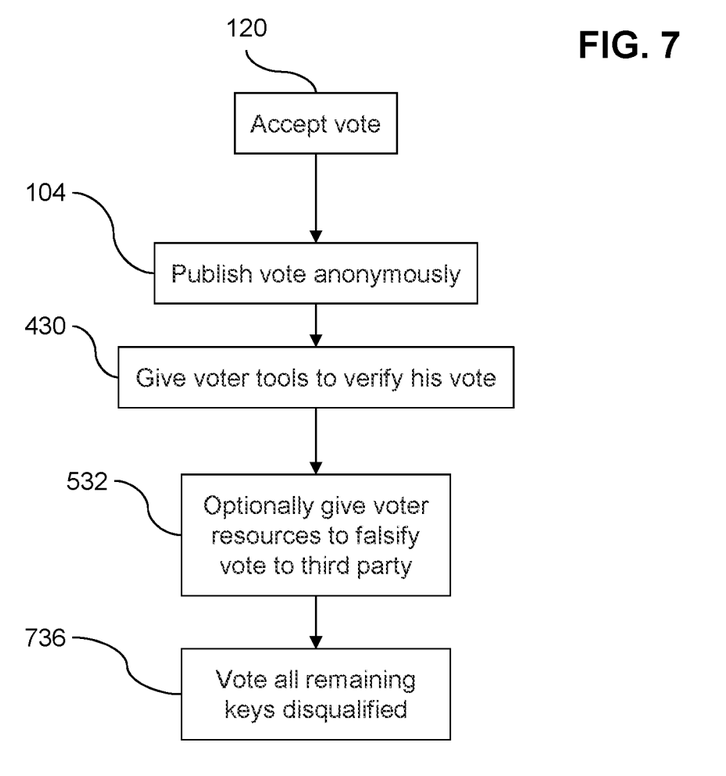
FIG. 7 is a flow chart illustration of a method of preserving anonymity and inhibiting cheating in a vote in accordance with an embodiment of the current invention.

In some embodiments, the system is configured to facilitate a voter hiding and/or falsifying 532 (e.g. see FIGS. 5 and/or 7) his vote. Optionally, the system may facilitate a voter supplying 128, 532 substantiation that he voted for any party. For example, after validation of the voter's vote, the voter can publish anonymously his private and public keys. Optionally, the system may supply 128, 532 a voter the option to show to other people substantiation that he voted differently than his actual vote. the system may supply 128, 532 a voter a different private key from his private key. For example, the supplied key may include a real private key of a real voter that voted for a different party. A voter may claim to have voted for the party of the anonymously published private key and/or hide his real vote. For example, the published public keys may not be visible to all. For example, anyone can ask for a public key that belongs to a vote to a specific party. In some embodiments, this facilitates a voter being able to claim that this was his vote. For example, this may inhibit buying or extorting votes, because a buyer/extorter will have difficulty knowing for whom the person that he is trying to influence really voted. In some embodiments, the time of a vote may be published, optionally the voter may be supplied 128 with an anonymously published key that was used in a similar timeframe to the time that he voted (e.g. from the same time block that he voted). The voter may use the supplied anonymous private key to prove that he voted for a particular party and that the ballot box got it, the ballot box knows that there is a vote that came from a voter who has a valid private key. Optionally there will be a waiting period before supplying 128 the anonymous published key and/or the anonymous published key may only be supplied to a voter who has checked 124, 126 and/or confirmed the accuracy of his vote. For example, this may allow the voter to "prove" (e.g. to prevent electoral fraud) for whom he really voted as a long as he hasn't verified his vote and/or until the end of the waiting period. Alternatively or additionally, there may be a table (which may not be public) of anonymously publicized votes (for example if a user presents a private key that is not on the list of published keys this may be better evidence that his vote was really the one connected to the key). Alternatively or additionally, the timing of votes may be used to reduce the possibility of use of someone else's private key to try to claim that the vote was changed. Optionally, after voting and/or after verifying a vote, a medium of a voter including his private and/or public key may be erased, scrambled, encrypted and/or otherwise rendered unreadable to the public. The medium may remain readable with a key that is kept secret. This may inhibit vote buying and/or coercion. The secret key may be kept by election authorities and/or courts and/or used to substantiate an accusation of electoral fraud.

Figure 5:
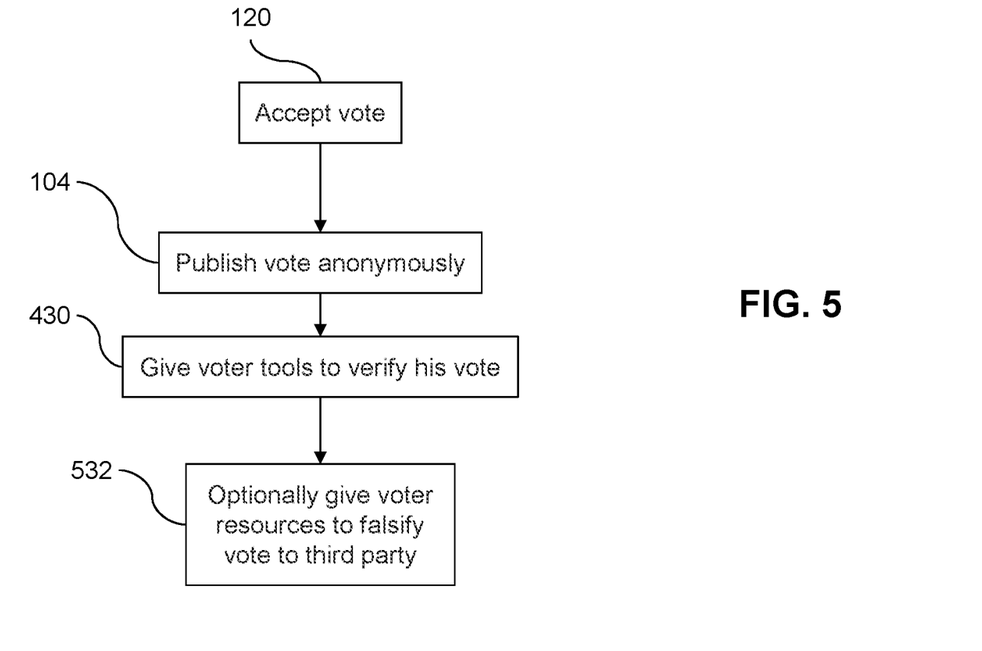
FIG. 5 is a flow chart illustration of a method of preserving anonymity in a vote in accordance with an embodiment of the current invention.

In some embodiments, private keys may remain private and/or there may be another key the remains private (is never publicized). For example, a never published key may be used as a proof mechanism, proving that the owner is the real voter. For, example, a non-publishable key may be used as a change key for a voter to change a vote previously make with his private key. Optionally, in order to change a vote a voter may need to supply proof that he is the real voter. For example, a user may be required to show up at a voting changing station with a physical medium (e.g. a dongle issued by the election commission) to show that he is the real voter in order to change his vote. Optionally, changing a vote may require validation, for example via encryption with an election commission private change key. For example, without the private key of the election committee, the change key may not work to change a vote, to vote and/or even to determine a matching public key. For example, if to make use of the change key, a user may be required to go personally to the election committee and/or identify himself.

Counting and Checking

In some embodiments, at the end of the election, votes on distributed ledger are counted publicly. Optionally the public counting does not diminish the anonymity of the vote. For example, because it is inhibited to know to whom each public key belongs. Optionally, it is facilitated to validate with the public key that the vote was signed with a private key of a legal voter. In some embodiments the facilitates anyone counting the votes and verifying the results In some embodiments, each voter can check 126 that his vote appears in the table exactly as he voted, and if something cheated with his vote, he can alert 130 and show that the original vote was different, because he has a validated 106 vote encrypted with the private key from the Election Commission (the confirmed vote). If the commission denies, he can demand from the commission to show his original ballot encrypted with his private key and a proper time stamp. They are inhibited from supplying the signed request if they do not have his private key. Additionally or alternatively, if his vote fails to appear in the distributed ledger, implying that he did not vote at all, then he can show his vote validated 128 by encryption with his private key and the private key of the election commission as proof that he did vote.

Inhibiting Stealing of Keys

In some embodiments, a system of voting may include features that inhibit stealing the private keys before they reach the intended voter. For example, stealing a dongle holding a private key of a voter from a courier before the key reaches the voter. In some embodiments, the number of generated 110 keys exactly as the number of voters. If someone steals a significant number of keys there will be voters that do not receive keys. These voters can be expected to alert 130 the appropriate authorities to invalidate the stolen keys and/or the election and/or to punish the perpetrators.

In some embodiments, the keys are separated 634 (e.g. see FIG. 6) into groups. For example, the size of the groups may range between 10 to 100 and/or 100 to 500 and/or 500 to 4000 and/or 4000 to 20000 and/or 20000 to 100000 keys. Optionally, each group set is supposed to reach a specified group of people and/or the particular recipient of an individual key is anonymous and/or not known. Each group of keys has a security officer who is accountable. After distribution of the different groups of keys the recipients can be queried. If in the portion of voters not receiving keys in one group is significantly larger than another, this can be interpreted as a sign that keys were stolen and/or there is another problem. Optionally, an entire problematic group may be discarded and/or new keys generated and/or sent to voters. Optionally, an investigation will find the perpetrators of the disappearance of the missing keys. For example, division into groups saves the need to disqualify all keys in case of theft and/or increases the sensitivity of the system to theft of keys from a particular batch and/or location.

Figure 6:
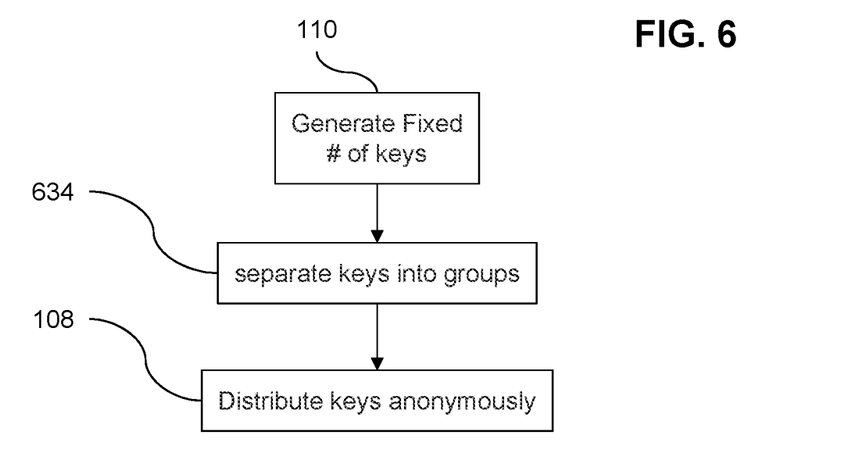
FIG. 6 is a flow chart illustration of a method of inhibiting cheating in a vote in accordance with an embodiment of the current invention.

In some embodiments the system is configured to inhibit an unauthorized person stealing a private key voting and then returning the key to be delivered to a properly registered voter. For example, in some embodiments when the registered voter, a person will come to vote he will be informed that somebody already voted with his key and be prevented from voting. For example, when a vote is validated 106 the election commission may search the distributed ledger to make sure that the voter's public key does not appear with a previous vote. In that case, the system optionally facilitates alerting 130 an authority of the problem. Optionally, the previous vote may be invalidated and/or the voter may be allowed to vote again.

In some embodiments, the distributed ledger may include a time that the key was distributed 108 to the voter and/or a time when the vote was received 120. The election commission and/or an interested party may compare the time of distribution 108 to the time of reception 120. If the time of reception 120 precedes the time of distribution 108 then the vote may be invalidated. If many such aberrations occur in one group of keys and/or one election the entire group and/or election may optionally be invalidated.

In some embodiments, electronic voting may allow elections without interrupted functioning of the country and/or economy. Elections and/or referendums may be made more often and/or may last for longer time periods than conventionally.

Unauthorized Use of Unclaimed Keys

In some embodiments, the system is configured to inhibit the use of unclaimed keys. In some embodiments, the distribution 108 of private keys is anonymous. For example, the system may be designed so that it is not known and/or hard to know the and/or it is not recorded which private key is associated with which voter and/or with which public key. Optionally, it will be difficult to differentiate used private keys from unused keys and/or a person who tries to vote with unused/unclaimed keys will also be using claimed keys and/or cause double voting which will be stopped and/or investigated and/or invalidated the election, for example as described in embodiments above.

In some embodiments, each voter is recorded 112 in the ledger that he receives a key from his batch. If the number of votes in a batch are more than the number of keys distributed then the unauthorized use of the keys is detected and corrective action (e.g. invalidating, investigating) is taken. Alternatively or additionally, the public key of distributed keys may be recorded 112 in the distributed ledger. If a key that was not distributed is associated with a vote, that vote may be disqualified and/or if there are a large number of such aberrations a batch of keys and/or the election may be disqualified and/or investigation and/or corrective action may be taken.

In some embodiments, keys are separated 634 into batches. Optionally, the names of voters and/or the anonymous numbers of distributed 108 public keys and/or the time of distribution 108 and/or to which batch a public key pertains is recorded 112 in the distributed ledger. If a key is used that was not distributed the vote may be disqualified. When a batch has signs of tampering and/or unusual voter turn out it may be investigated if all of the reported voters really received keys and/or voted. When the time of receiving 120 of a large number of votes doesn't fit the time of distribution 108 of keys, the batch may be investigated. Alternatively or additionally, keys that remain and/or were not distributed 108 may be used by the system to vote as disqualified 736. When the number of votes added to the number of disqualified keys is different from and/or is greater than the number of keys generated 110 then corrective action may be taken.

Voting System

Figure 2:
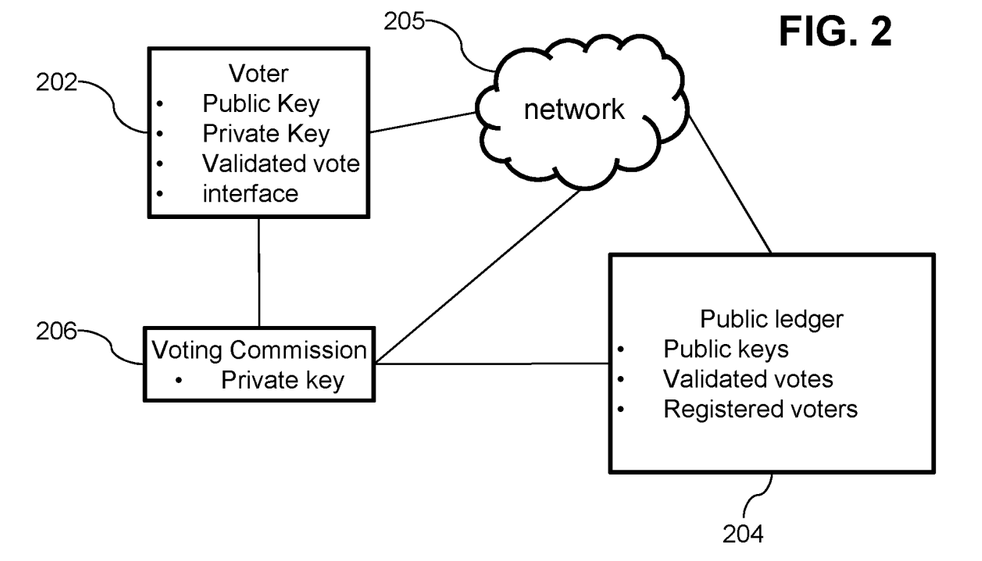
FIG. 2 is a block diagram of a system of voting in accordance with an embodiment of the current invention.

FIG. 2 is a block diagram of a voting system in accordance with an embodiment of the current invention. In some embodiments, a voter 202 is supplied with a private key and/or a public key and a user interface for voting. For example, the voter may employ the user interface to prepare a ballot with his election choice and to encrypt the ballot and send it to an election commission 206. Optionally communication between the voter 202 and the election commission 206 may be via a network 205 (e.g. the Internet). Alternatively or additionally, communication may include a physical medium. For example, an election commission 206 may supply a private key to a voter 202 on a physical medium, for example a dongle. For example, the dongle may be supplied to the voter when he turns up in person at an election station and/or may be mailed to the voter 202.

In some embodiments, the election commission 206 checks the validity of the ballot received from a voter 202. For example, the election commission may check that no one has voted previously with the private key of the voter 202 and/or check that the private key of the voter 202 corresponds to a valid public key. Optionally, the election commission includes a user interface for facilitating real people performing functions manually. Alternatively or additionally, the election commission includes an automated system (e.g. a processor) for performing the functions. Optionally, the election commission further encrypts the ballot with a private key of the election commission 206 and/or publishes a double encrypted vote on a public ledger 204. Additionally or alternatively, voting commission 206 may send a double encrypted substantiation of the ballot to voter 202. Optionally, voter 202 has access to public ledger 204 and/or can check his vote and/or make sure that it is correctly listed. Optionally, various organizations such as political parties and/or poll watchers may read from public ledger 204 and/or check and/or count the election results. For example, access to the ledger 204 may be available of a public network 205. Optionally, the system of FIG. 2 may be used to perform the various methods of voting disclosed herein (for example as described in FIGS. 1 and/or 4-7.

Figure 3:
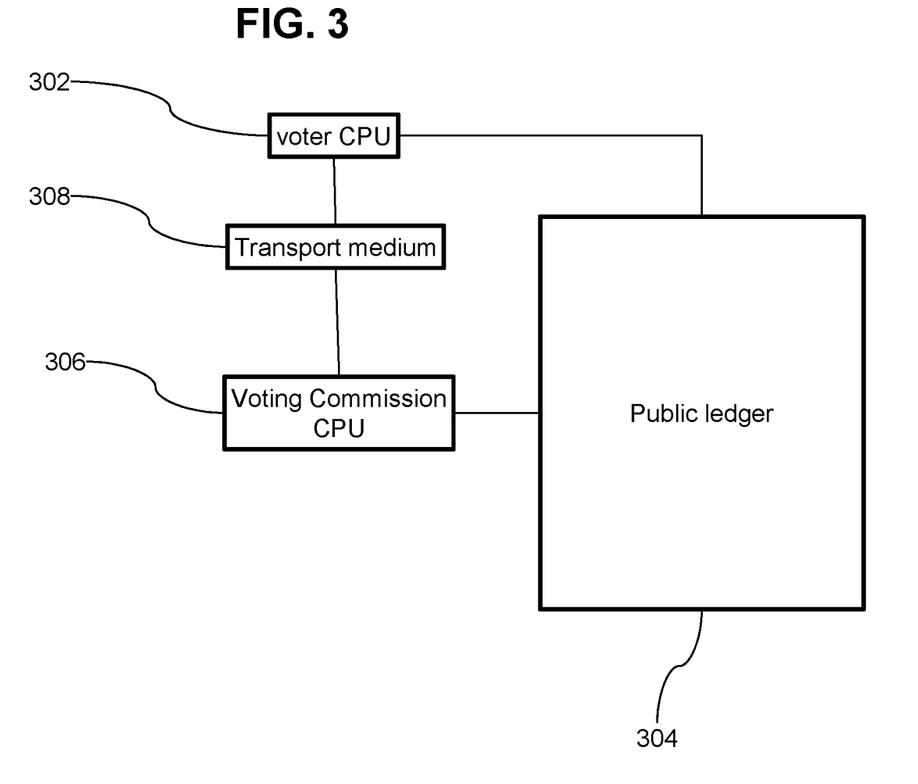
FIG. 3 is a block diagram of a system of voting in accordance with an embodiment of the current invention.

FIG. 3 is a block diagram of a voting system in accordance with an embodiment of the current invention. In some embodiments, a voter 302 receives registration material (e.g. a private key) from an election commission over a transport medium 308. For example, the medium 308 may include various computer readable forms such as encrypted network communications and/or a physical medium such as a disk and/or a dongle. For example, the election commission 306 may send to the user substantiation of his vote by which to support in the case of accused fraud his true vote. Additionally or alternatively, the election commission 306 may supply the voter 302 with false substantiation of another vote (for example, the voter 302 may use the false substantiation to protect himself against vote buyers and/or those who coerce him to vote for a particular party. In some embodiments, a public ledger 304 is available to a voter and/or other interested parties (for example, via network access). The Optionally, the system of FIG. 2 may be used to perform the various methods of voting disclosed herein (for example as described in FIGS. 1 and/or 4-7.

In some embodiments, the election is protected from fraud, voting is less disruptive. For example, an election may be held without closing down economy for the election period (e.g. election day). In some embodiments, the cost of running an election via on-line voting is much smaller than convention elections (e.g. by reducing the number of people and the infrastructure for managing manual polling stations).

It is expected that during the life of a patent maturing from this application many relevant technologies for example for transferring data and/or protecting data privacy will be developed and the scope of the terms in the specification (e.g. medium, dongle, private key and/or public key) are intended to include all such new technologies a priori.

As used herein the term "about" refers to ±10% unless stated otherwise. The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for on-line voting comprising:
distributing a plurality of respective private keys and associated public keys anonymously to each respective voter of a plurality of voters;
publishing a list of the plurality of public keys on a secure public ledger;
receiving an encrypted vote, encrypted with the respective private key of the respective voter;
recording the encrypted vote on a said secure public ledger; and
reading said encrypted vote from the secure public ledger for counting an election result;
validating said encrypted vote by an election committee and
further encrypting said encrypted vote after said validating with a private key of said election committee resulting in a double encrypted validated vote and wherein said recording is of said double encrypted validated vote.

2. The method of claim 1, further comprising:

Publishing in said public ledger, a time of distributing of a respective private key said plurality of respective private keys.

3. The method of claim 2, wherein said time is approximate.

4. The method of claim 1, further comprising:

supplying the respective voter with a substantiation of his vote.

5. The method of claim 1, further comprising:

supplying the respective voter with a substantiation of a vote that is not his vote.

6. The method of claim 1, wherein said public ledger includes a block chain.

7. The method of claim 1, further comprising:

publishing a list of registered voters on said secure public ledger.

8. The method of claim 1, further comprising:

publishing, on said secure public ledger, a list of voters having received a private key of said plurality of respective private keys.

9. The method of claim 1, wherein said distributing includes giving to the respective voter a physical machine readable medium including said respective private key.

10. The method of claim 9, wherein said physical machine readable medium includes a dongle.

11. The method of claim 1, further comprising:

generating said plurality of respective private keys in a number exactly equal to a number of registered voters.

12. The method of claim 1, further comprising:

separating said plurality of respective private keys into batches and wherein said distributing is separate for each of said batches.

13. The method of claim 12, wherein an identity of a batch of each said associated public keys is published in said secure public ledger.

14. The method of claim 1, further comprising:

supplying a mechanism to the respective voter to check that his vote is recorded properly on said secure public ledger.

15. The method of claim 1, further comprising:

supplying the respective voter with a means to claim to have voted for a different party than his real vote.

16. The method of claim 15, wherein said means to claim to have voted for a different party includes supplying a private key different from the private key of the voter.

17. A method for on-line voting comprising:

distributing a plurality of respective private keys and associated public keys anonymously to each respective voter of a plurality of voters;

publishing a list of the plurality of public keys on a secure public ledger;

receiving an encrypted vote, encrypted with the respective private key of the respective voter;

recording the encrypted vote on a said secure public ledger; and reading said encrypted vote from the secure public ledger for counting an election result, wherein said distributing includes distributing a respective vote changing key of a plurality of respective vote changing private keys, the method further comprising adding a changed vote encrypted with said respective vote changing key after said recording and wherein said counting said election result includes counting said changed vote and not counting said respective encrypted vote.

18. The method of claim 17, further comprising:

publishing, in said secure public ledger, a time of distributing of a respective key of said plurality of respective private keys.

19. The method of claim 18, wherein said time is approximate.

20. The method of claim 17, wherein said public ledger includes a block chain.

21. The method of claim 17, further comprising:

publishing a list of registered voters on said secure public ledger.

22. The method of claim 17, further comprising:

publishing, on said secure public ledger, a list of voters having received a private key of said plurality of respective private keys.

23. The method of claim 17, wherein said distributing includes giving to the respective voter a physical machine readable medium including said respective private key.

24. The method of claim 23, wherein said physical machine readable medium includes a dongle.

25. The method of claim 17, further comprising:

generating said plurality of respective private keys in a number exactly equal to a number of registered voters.

26. The method of claim 17, further comprising:

separating said plurality of respective private keys into batches and wherein said distributing is separate for each of said batches.

27. The method of claim 26, wherein an identity of a batch of each said associated public keys is published in said secure public ledger.

28. The method of claim 17, further comprising:

supplying a mechanism to the respective voter to check that his vote is recorded properly on said secure public ledger.

29. The method of claim 17, further comprising:

supplying the respective voter with a substantiation that his vote was recorded properly in the public ledger.

30. The method of claim 17, further comprising:

supplying the respective voter with a means to claim to have voted for a different party than his real vote.

31. The method of claim 30, wherein said means to claim to have voted for a different party includes supplying a private key different from the private key of the voter.

32. The method of claim 17, wherein said respective vote changing key is a half key and wherein said adding said changed vote require encrypting said changed vote with said respective vote changing key and a second half key that was not distributed to said respective voter in said distributing.

33. The method of claim 32, wherein said second half key is in the possession of said election committee.

* * * * *